United States Patent
Segovia et al.

(10) Patent No.: US 8,021,101 B2
(45) Date of Patent: Sep. 20, 2011

(54) WIND TURBINE AND METHOD OF ASSEMBLING THE SAME

(75) Inventors: Eugenio Yegro Segovia, Madrid (ES); Pedro Luis Benito Santiago, Rheine (DE)

(73) Assignee: General Electric Company, Schenectady, NY (US)

( * ) Notice: Subject to any disclaimer, the term of this patent is extended or adjusted under 35 U.S.C. 154(b) by 332 days.

(21) Appl. No.: 12/334,623

(22) Filed: Dec. 15, 2008

(65) Prior Publication Data

US 2010/0140948 A1    Jun. 10, 2010

(51) Int. Cl.
*F03D 7/02* (2006.01)

(52) U.S. Cl. .............. 415/4.3; 415/4.5; 415/908; 416/9; 416/170 R; 416/244; 416/DIG. 6

(58) Field of Classification Search .............. 416/170 R, 416/9, 244 R, 244 A, DIG. 6, 110; 415/4.3, 415/4.5, 908, 905; 290/44, 55; 29/889.2, 29/893.1, 434

See application file for complete search history.

(56) References Cited

U.S. PATENT DOCUMENTS

| | | | | |
|---|---|---|---|---|
| 4,178,124 A | * | 12/1979 | Puskas | 415/4.5 |
| 4,515,525 A | | 5/1985 | Doman | |
| 4,692,094 A | * | 9/1987 | Kulinyak | 416/11 |
| 5,046,248 A | * | 9/1991 | Lederman | 29/898.041 |
| 6,814,493 B2 | * | 11/2004 | Wobben | 384/420 |
| 2003/0230898 A1 | * | 12/2003 | Jamieson et al. | 290/55 |
| 2004/0253093 A1 | * | 12/2004 | Shibata et al. | 415/4.1 |
| 2005/0042101 A1 | * | 2/2005 | Hur | 416/132 B |
| 2008/0285903 A1 | * | 11/2008 | Olsen | 384/516 |
| 2010/0176601 A1 | * | 7/2010 | Pechlivanoglou et al. | 290/55 |

FOREIGN PATENT DOCUMENTS

| | | |
|---|---|---|
| EP | 1 365 147 A2 | 11/2003 |
| GB | 0707909.8 | * 10/2008 |

* cited by examiner

*Primary Examiner* — Edward Look
*Assistant Examiner* — Aaron R Eastman
(74) *Attorney, Agent, or Firm* — James McGinness, Esq.; Armstrong Teasdale LLP (57) ABSTRACT

A method of assembling a wind turbine is provided. The method includes coupling a support flange to an inner surface of a tower, and positioning a yaw bearing on the support flange. The yaw bearing includes a plurality of horizontally oriented rollers. A base of a nacelle assembly is positioned on the yaw bearing such that the base is rotatable with respect to the tower.

19 Claims, 5 Drawing Sheets

WIND TURBINE AND METHOD OF ASSEMBLING THE SAME

BACKGROUND OF THE INVENTION

The embodiments described herein relate generally to nacelle assemblies for wind turbines and, more particularly, to a yaw bearing within a nacelle assembly.

At least some known wind turbines include a yaw bearing between a nacelle and a tower of the wind turbine. The yaw bearing allows the nacelle to be rotated with respect to a direction of the wind. More specifically, the yaw bearing usually includes gearing and a yaw drive motor rotates by the nacelle by engaging the gearing of the yaw bearing.

At least some known yaw bearings are slew bearings that include concentric races. Between the concentric races, the slew bearing can include balls, vertically oriented rollers, and/or a slide surface. The gearing can either be located on an inner surface of an inner race or an outer surface of an outer race. Either the inner race is coupled to the nacelle and the outer race is coupled to the tower, or the inner race is coupled to the tower and the outer race is coupled to the nacelle. The race coupled to the tower includes the gearing. To control the yaw of the nacelle, the yaw drive motors rotate against the gearing to pivot the nacelle about the tower. Yaw brakes are used to prevent the nacelle from rotating when the yaw drive motor is not operating. Also, during yawing, the yaw motors drive against yaw brake calipers, which are partly released and/or engaged, such that the yawing motion is smooth. Further, such slew bearings require high precision fabrication and/or manufacturing, which may be time-consuming and/or costly.

At least some other known yaw bearings are slide bearing that do not include balls and/or roller between races of the bearing. Such slide bearings includes slide surfaces having a lubricant therebetween. However, such lubricant may deteriorate and/or slide surfaces may wear during use of wind turbine. Accordingly, there is a need for a yaw bearing that does not require yaw breaks and/or high precision manufacturing and/or fabrication. Further, there is a need for a yaw bearing that does not include lubricant and/or surfaces that wear during use of the wind turbine.

BRIEF DESCRIPTION OF THE INVENTION

In one aspect, a method of assembling a wind turbine is provided. The method includes coupling a support flange to an inner surface of a tower, and positioning a yaw bearing on the support flange. The yaw bearing includes a plurality of horizontally oriented rollers. A base of a nacelle assembly is positioned on the yaw bearing such that the base is rotatable with respect to the tower.

In another aspect, a nacelle assembly is provided. The nacelle assembly includes a base, a support flange extending from a tower, and a yaw bearing coupled between the base and the support flange. The yaw bearing includes a plurality of horizontally oriented rollers configured to support the base thereon.

In yet another aspect, a wind turbine is provided. The wind turbine includes a tower coupled to a supporting surface and a nacelle assembly coupled to the tower. The nacelle assembly includes a base, a support flange extending from the tower, and a yaw bearing coupled between the base and the support flange. The yaw bearing includes a plurality of horizontally oriented rollers configured to support the base thereon.

The embodiments described herein support bending and/or torsion moments laterally and support a weight of the nacelle on a flat or tapered bearing or a sliding ring. The embodiments described herein do not require the use of a yaw break and/or a high precision machined/fabricated yaw bearing. Further, the yaw bearing described herein is not a sliding in which slide surface may wear against each other.

DETAILED DESCRIPTION OF THE INVENTION

The embodiments described herein can be used with bucket-type yaw systems in which bending and/or torsion moments are supported laterally and a weight of the nacelle is supported by a flat or tapered bearing or a sliding ring, such as an open needle slew bearing. Such a bearing configuration does not require yaw breaks and/or high precision machining and/or fabrication of the bearing. Further, the embodiments described herein include at least one sliding pad that is in contact with a base of the nacelle and includes low friction material. Such a sliding pad supports the nacelle laterally while allowing the nacelle to rotate with respect to a tower.

Figure 1:
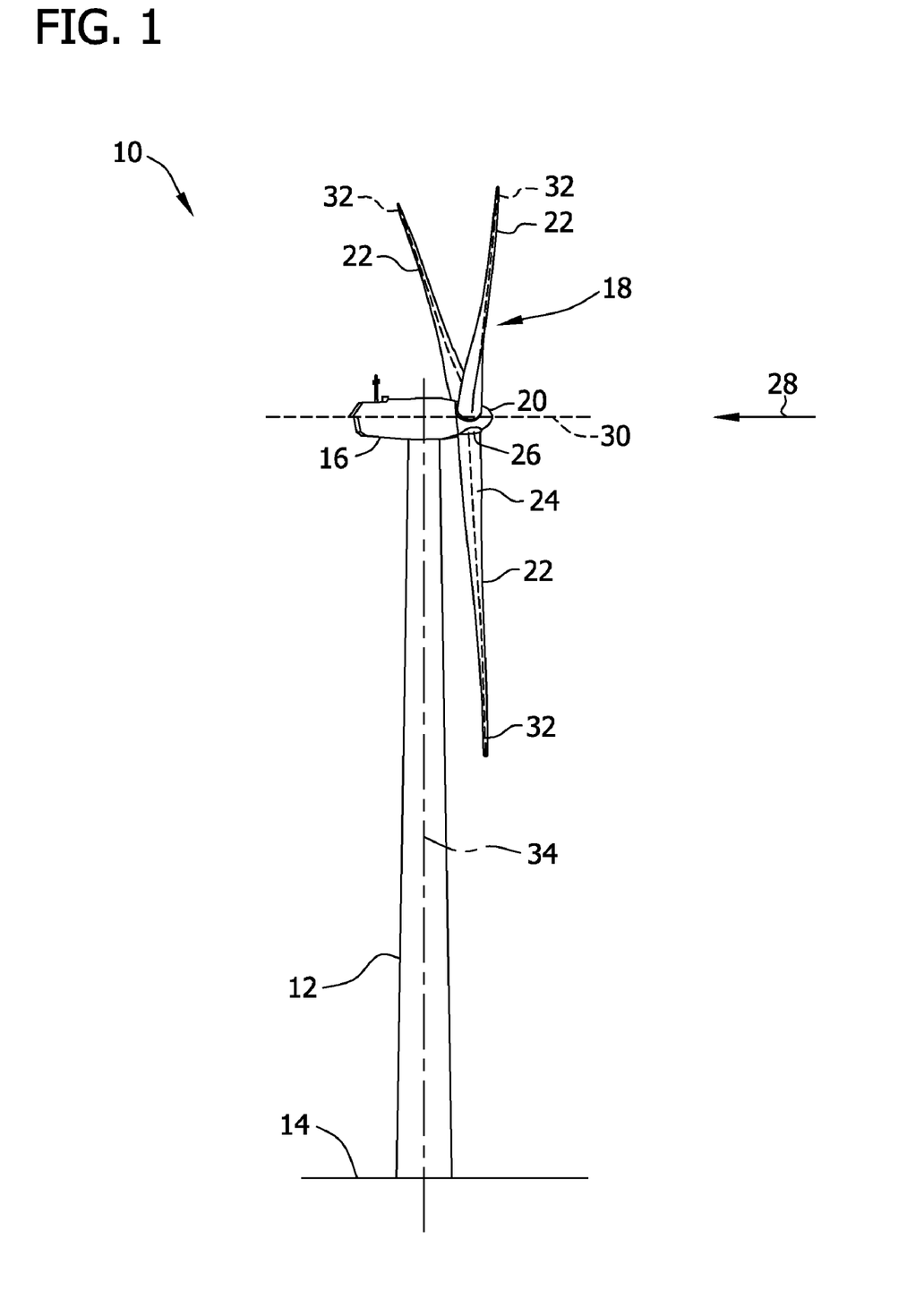
FIG. 1 is a side elevation view of an exemplary wind turbine.

FIG. 1 is a side elevation view of an exemplary wind turbine 10. In the exemplary embodiment, wind turbine 10 is a nearly horizontal-axis wind turbine. In another embodiment, wind turbine 10 may have an up-tilt angle (not shown) ranging from about 1° to about 15°. Alternatively, wind turbine 10 may be a vertical axis wind turbine. In the exemplary embodiment, wind turbine 10 includes a tower 12 that extends from a supporting surface 14, a nacelle 16 mounted on tower 12, and a rotor 18 that is coupled to nacelle 16. Rotor 18 includes a rotatable hub 20 and a plurality of rotor blades 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel such that a cavity (not shown in FIG. 1) is defined between supporting surface 14 and nacelle 16. In an alternate embodiment, tower 12 is a lattice tower. A height of tower 12 is selected based upon factors and conditions known in the art.

Blades 22 are spaced about rotor hub 20 to facilitate rotating rotor 18 to enable kinetic energy to be transferred from the wind into usable mechanical energy, and subsequently, electrical energy. Blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to blades 22 are transferred to hub 20 via load transfer regions 26.

In the exemplary embodiment, blades 22 have a length ranging from about 50 feet (ft) (about 15 meters (m)) to about 300 ft (about 91 m). Alternatively, blades 22 may have any length that enables wind turbine 10 to function as described herein. For example, other non-limiting examples of blade lengths include 10 m or less, 20 m, and 37 m. As wind strikes blades 22 from a direction 28, rotor 18 is rotated about an axis of rotation 30. As blades 22 are rotated and subjected to centrifugal forces, blades 22 are also subjected to various bending moments and other operational stresses. As such, blades 22 may deflect and/or rotate from a neutral, or non-deflected, position to a deflected position and associated stresses, or loads, may be induced in blades 22. Moreover, a pitch angle of blades 22, i.e., the angle that determines a perspective of blades 22 with respect to direction 28 of the wind, may be changed by a pitch adjustment mechanism (not shown in FIG. 1) that facilitates increasing or decreasing blade 22 speed by adjusting the surface area of blades 22 exposed to the wind force vectors. Pitch axes 32 for blades 22 are illustrated. In the exemplary embodiment, each blade's pitch is controlled individually. Alternatively, the blade pitch for all blades may be controlled simultaneously. Further, in the exemplary embodiment, as direction 28 changes, a yaw direction of nacelle 16 may be controlled about a yaw axis 34 to position blades 22 with respect to direction 28.

Figure 2:
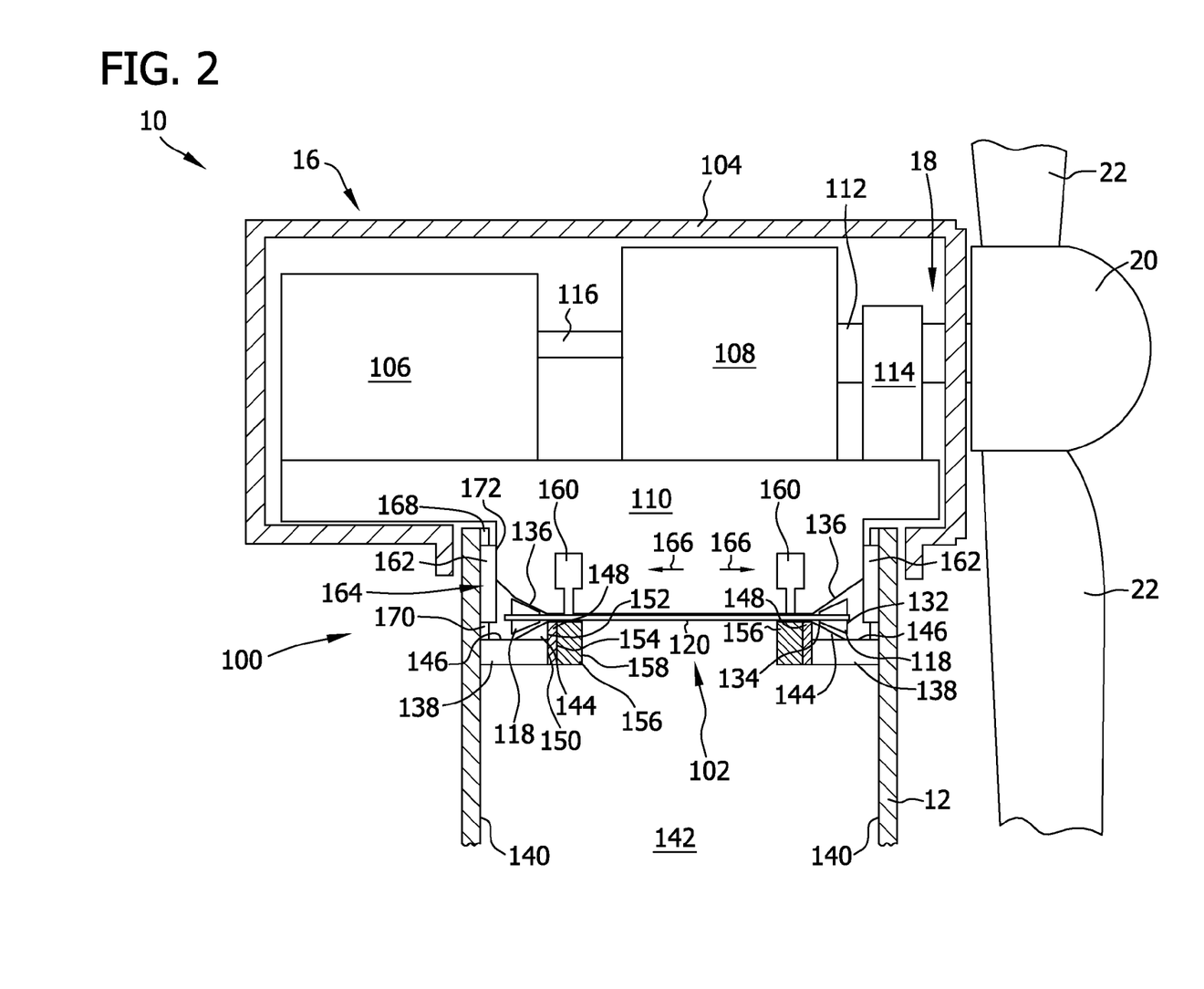
FIG. 2 is a cross-sectional schematic view of an exemplary nacelle assembly that may be used with the wind turbine shown in FIG. 1.
Figure 3:
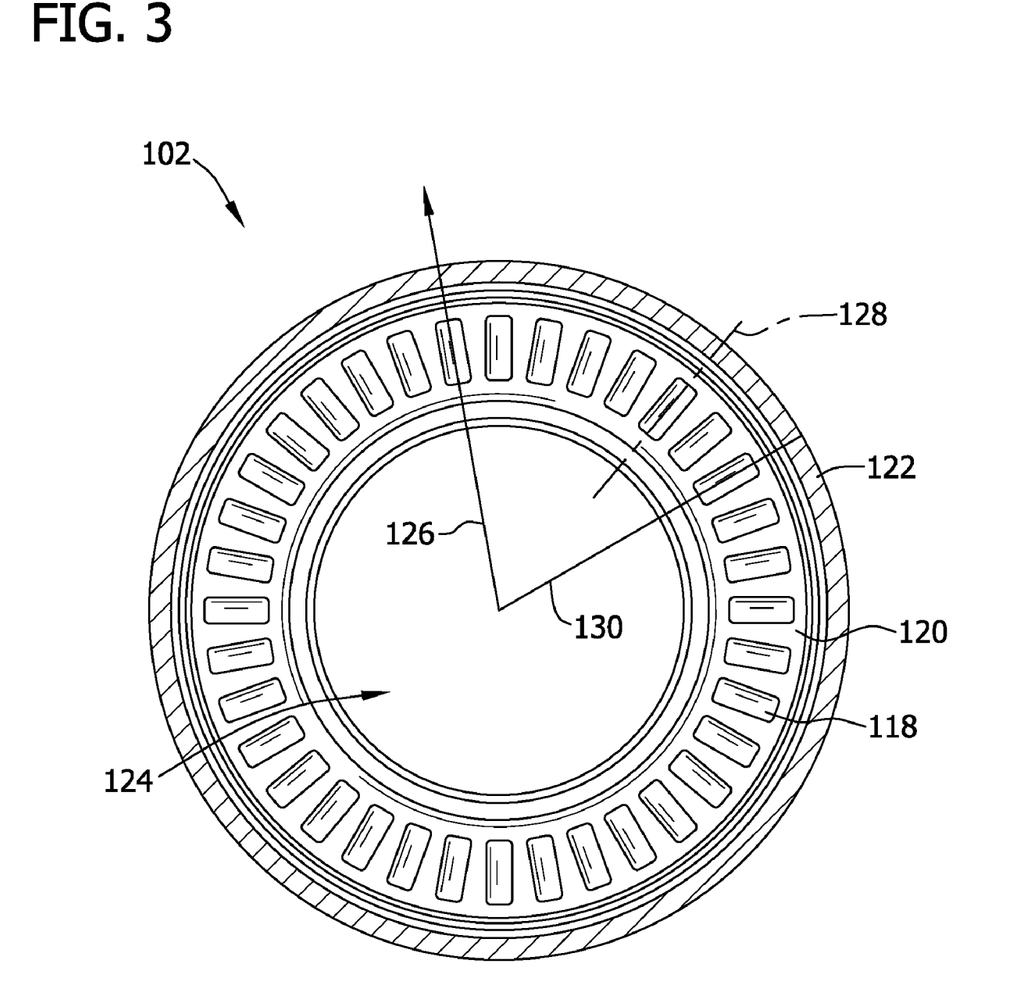
FIG. 3 is a top view of a bearing that may be used with the wind turbine shown in FIG. 2.

FIG. 2 is a cross-sectional schematic view of an exemplary nacelle assembly 100 that may be used with wind turbine 10 (shown in FIG. 1). In the exemplary embodiment, nacelle assembly 100 may be used as nacelle 16 (shown in FIG. 1). As such, components shown in FIGS. 1 and 2 are numbered similarly. FIG. 3 is a top view of a yaw bearing 102 that may be used with nacelle assembly 100. In FIG. 3, a top case of bearing 102 is not shown for clarity.

Nacelle assembly 100 includes a nacelle housing 104 coupled about a generator 106, a gearbox 108, and a base 110. Generator 106 and gearbox 108 are supported on base 110. A low speed shaft 112 extends between gearbox 108 and hub 20 and is supported on base 110 by a main bearing 114. A high speed shaft 116 extends between gearbox 108 and generator 106. During operation of wind turbine 10, wind rotates blades 22, which rotates hub 20 and low speed shaft 112. Through gearbox 108, low speed shaft 112 rotates high speed shaft 116 to drive generator 106 to generate power. In the exemplary embodiment, high speed shaft 116 rotates at a higher rotation per minute (rpm) than an rpm at which low speed shaft 112 rotates.

In the exemplary embodiment, base 110 is coupled to tower 12 to secure nacelle assembly 100 to tower 12. More specifically, in the exemplary embodiment, base 110 is coupled to tower 12 using yaw bearing 102 such that nacelle assembly 100 is rotatable about yaw axis 34 (shown in FIG. 1), as described in more detail herein. Yaw bearing 102 is, in the exemplary embodiment, an open needle slew bearing. Alternatively, yaw bearing 102 can be any suitable flat roller bearing, tapered roller bearing, and/or sliding ring that enables nacelle assembly 100 to function as described herein. More specifically, in the exemplary embodiment, yaw bearing 102 is substantially cylindrical and includes a plurality of rollers 118 coupled to a cage 120. A case 122 surrounds rollers 118 and cage 120. A center opening 124 is defined by cage 120 and/or case 122. In the exemplary embodiment, machining and/or fabrication of bearing 102 and/or rollers 118 is not required to be high precision positioning, as compared to known yaw bearings that require high precision machining and/or fabrication.

As shown in FIG. 3, rollers 118 are positioned horizontally within case 122 to form a roller table within bearing 102. Further, rollers 118 are each generally aligned along a radial direction 126 with respect to case 122. More specifically, a center axis 128 of each roller 118 is substantially aligned with a respective radius 130 of yaw bearing 102. Moreover, in the exemplary embodiment, rollers 118 are each tapered such that rollers 118 are each frusto-conically shaped. Rollers 118 are positioned within case 122 such that a wider end 132 of each roller 118 is radially outward from a narrower end 134 of roller 118. Alternatively, and as described in more detail below, rollers 118 may have any suitable shape that enables wind turbine 10 to function as described herein. In the exemplary embodiment, a portion 136 of base 110 is shaped to complement and/or correspond to the shape of rollers 118.

In the exemplary embodiment, yaw bearing 102 is supported on a support flange 138 extending radially inward from an inner surface 140 of tower 12. More specifically, support flange 138 circumferentially extends about inner surface 140. As such, a cavity 142 of tower 12 is at least partially circumscribed by support flange 138. Cavity 142 is defined by inner surface 140 of tower 12. In one embodiment, support flange 138 is formed integrally as one-piece with tower 12. In an alternative embodiment, support flange 138 is formed separately from tower 12 and coupled to tower 12 using any suitable fastening devices and/or techniques. In the exemplary embodiment, a center bearing retainer 144 extends upwardly from an upper surface 146 of support flange 138. In one embodiment, center bearing retainer 144 is formed integrally as one-piece with support flange 138. In an alternative embodiment, center bearing retainer 144 is formed separately from support flange 138 and coupled to support flange 138 using any suitable fastening devices and/or techniques. In the exemplary embodiment, center bearing retainer 144 has a shape that is complementary to a shape of rollers 118. More specifically, center bearing retainer 144 has a wedge shaped cross-sectional shape to correspond to the frusto-conical shape of rollers 118.

An outer tooth gear 148 is coupled to at least an inner surface 150 of support flange 138. More specifically, in the exemplary embodiment, outer tooth gear 148 is coupled to inner surface 150 of support flange 138 and to an inner surface 152 of center bearing retainer 144. Inner surface 150 and inner surface 152 are substantially co-planar. Alternatively, inner surface 150 and inner surface 152 are non-co-planar. In the exemplary embodiment, outer tooth gear 148 includes a plurality of teeth along an inner surface 154 of outer tooth gear 148. The teeth of outer tooth gear 148 may be any suitable shape that enables wind turbine 10 to function as described herein. In the exemplary embodiment, outer tooth gear 148 is substantially cylindrical and coupled to entire inner surface 150 of at least support flange 138.

In the exemplary embodiment, at least one inner tooth gear 156, or pinion, engages and/or interconnects with inner surface 154 of outer tooth gear 148. More specifically, teeth defined in a surface 158 of inner tooth gear 156 engage the teeth defined in inner surface 154 of outer tooth gear 148. As such, the teeth of inner tooth gear 156 are complementary and/or correspond to the teeth of outer tooth gear 148. In the exemplary embodiment, inner tooth gear 156 is substantially cylindrical and has a smaller diameter than a diameter of outer tooth gear 148. At least one motor 160 is coupled to inner tooth gear 156 for driving inner tooth gear 156 with respect to outer tooth gear 148. More specifically, nacelle assembly 100 includes two motors 160 spaced diametrically with respect to outer tooth gear 148. Each motor 160 includes inner tooth gear 156 coupled thereto. Motors 160 are each coupled to base 110 for rotating nacelle assembly 100 about yaw axis 34 with respect to tower 12. Further, each motor 160 extends through yaw bearing 102 to a respective inner tooth gear 156. Although two motors 160 and inner tooth gears 156 are described herein, nacelle assembly 100 may include any suitable number of motors 160 and/or inner tooth gears 156 that enable wind turbine 10 to function as described herein.

Nacelle assembly 100 includes at least one sliding pad 162 coupled between base 110 and tower 12. More specifically, in the exemplary embodiment, sliding pad 162 is substantially cylindrical and includes a plurality of segments 164 coupled about inner surface 140 of tower 12. Segments 164 are coupled circumferentially about inner surface 140 such that segments 164 substantially encircle base 110. Sliding pad 162 is configured to reduce friction between base 110 and tower 12 when base 110 moves with respect to tower 12, for example, when base 110 is rotated about yaw axis 34 with respect to tower 12. Further, sliding pad 162 is configured to sustain thrust forces 166 that are obliquely and/or substantially perpendicularly directed with respect to yaw axis 34. As such, segments 164 of sliding pad 162 are configured to reduce friction along sliding pad 162 and sustain a thrust force 166. In the exemplary embodiment, sliding pad 162 is formed from an auto lubricant solid material, such as TEFLON® ("Teflon" is a registered trademark of E. I. Du Pony De Nemours and Company Corporation of Wilmington, Del.), nylon, polymide, and/or carbon, and/or from flexible pressurized pads. The flexible pads can be pressurized with a pressurizing media, such as oil, any suitable liquid, a fine grain media such as sand and/or carbon powder, and/or a gas such as air. Further, each segment 164 to be filled with the pressurizing media includes an aperture therein to fill each segment 164 with the pressurizing media individually and/or empty at least a portion of the pressurizing media from each segment 164 individually. In the exemplary embodiment, sliding pad 162 includes all solid material segments, all flexible pad segments, or a combination of solid material segments and flexible pad segments.

Sliding pad 162 is supported and/or secured to tower 12 by an upper support 168 and a lower support 170. In one embodiment, upper support 168 and/or lower support 170 is formed integrally as one-piece with tower 12. In an alternative embodiment, upper support 168 and/or lower support 170 is formed separately from tower 12 and coupled to tower 12 using any suitable fastening devices and/or techniques. In the exemplary embodiment, sliding pad 162 is positioned between upper support 168 and lower support 170 such that at least a portion of an inner surface 172 of sliding pad 162 is adjacent to base 110. As used herein, the term "adjacent" refers to one component of wind turbine 10 being positioned proximate and/or being positioned in direct contact with another component of wind turbine 10. As such, in the exemplary embodiment, inner surface 172 of sliding pad 162 is positioned proximate and/or positioned in direct contact with in base 110. Further, in the exemplary embodiment, upper support 168 and/or lower support 170 is removable from tower 12 to facilitate accessing segments of sliding pad 162. Although not shown in FIG. 2, nacelle assembly 100 may include a pan grease collector configured to collect bearing and/or gear fluids.

To construct wind turbine 10 including nacelle assembly 100, sliding pad 162 is coupled to tower 12 between upper support 168 and lower support 170. Outer tooth gear 148 is coupled at least to inner surface 150 of support flange 138. Yaw bearing 102 is positioned on support flange 138 with respect to center bearing retainer 144. At least one motor 160 is coupled to base 110 and inner tooth gear 156 is coupled to motor 160. Base 110, including motor 160 and inner tooth gear 156, is positioned on yaw bearing 102 such that inner tooth gear 156 engages outer tooth gear 148. Further, base 110 is positioned on yaw bearing 102 such that rollers 118 rotatably support base 110 with respect to tower 12. When base 110 is positioned on yaw bearing 102, a portion of base 110 is adjacent to sliding pad 162. When sliding pad 162 includes the pressurizing media, each segment 164 of sliding pad 162 is filled with the pressurizing media segments 164 are at a predetermined pressure.

During operation of wind turbine 10, motors 160 are used to control a yaw of nacelle assembly 100. More specifically, to change the yaw of nacelle assembly 100, motors 160 rotate inner tooth gears 156 with respect to outer tooth gear 148 to rotate base 110. Base 110 rotates with respect to tower 12 by rotating on rollers 118 within yaw bearing 102. Further, whether base 110 is or is not rotating with respect to tower 12, the frusto-conical shape of rollers 118 reduces lateral movement of base 110 with respect to tower 12. More specifically, portion 136 of base 110 contacts rollers 118 such that rollers 118 act against a lateral thrust force 166 applied by base 110 to rollers 118. Moreover, sliding pad 162 absorbs thrust forces 166 applied by base 110 when base 110 moves laterally with respect to tower 12. More specifically, when base 110 moves laterally with respect to tower 12, force 166 is opposed by sliding pad 162 when base 110 contacts sliding pad 162. Because sliding pad 162 includes a low friction material, when base 110 is in contact with sliding pad 162, base 110 can rotate about yaw axis 34 substantially without causing wear to base 110 and/or inner surface 140 of tower 12.

During construction and/or maintenance of wind turbine 10, each segment 164 of sliding pad 162 can be removed, replaced, and/or adjusted independently from other segments 164 of sliding pad 162 such that the entire sliding pad 162 is not required to be removed, replaced, and/or adjusted. More specifically, when segments 164 are formed from a solid material, at least one segment 164 is removed from nacelle assembly 100 for maintenance. When segments 164 include the pressurization media, at least one segment 164 is emptied or partially emptied of the pressurization media to enable maintenance to be performed on the segment 164 and/or removal of the segment 164.

Figure 4:
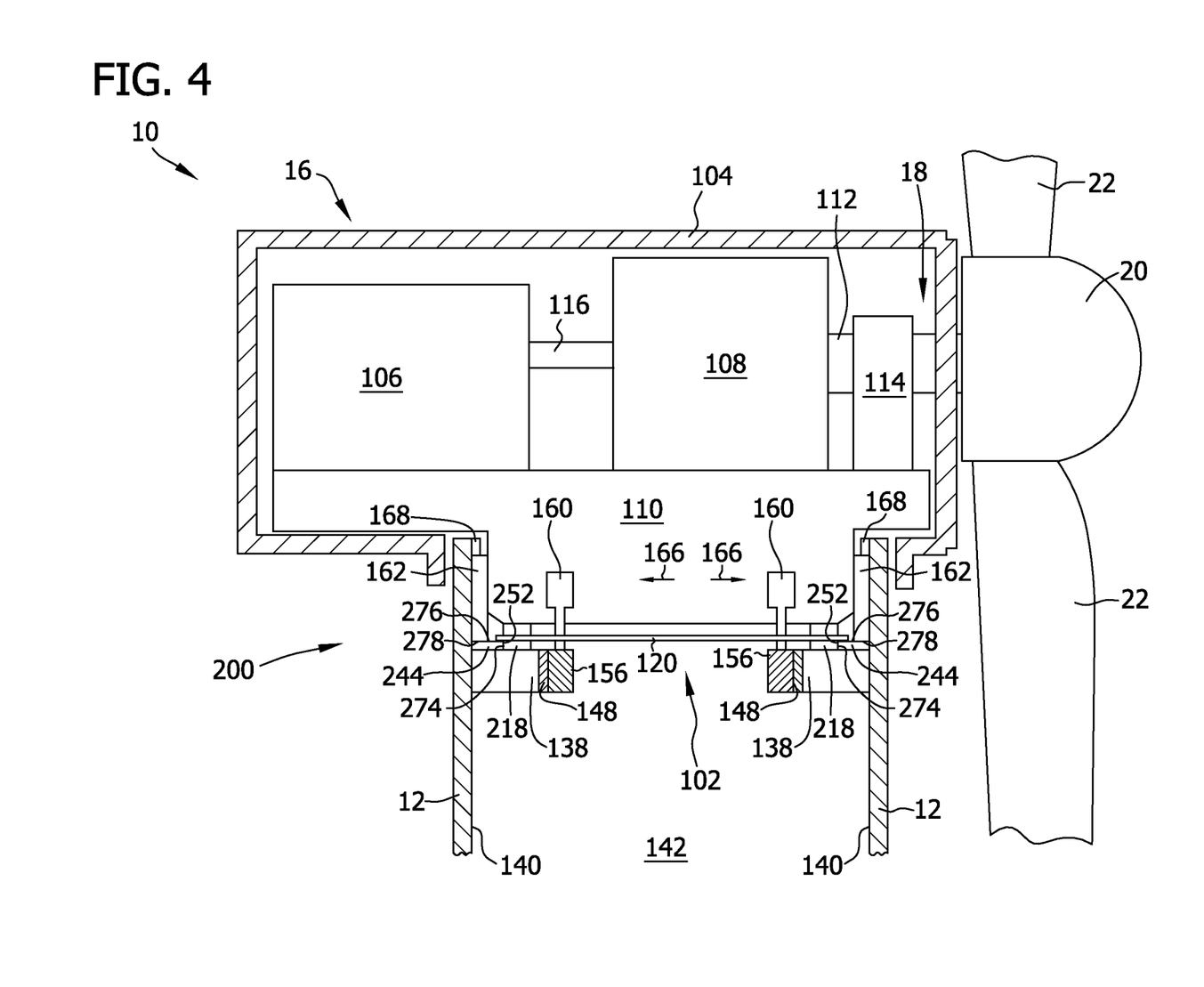
FIG. 4 is a cross-sectional schematic view of a first alternative nacelle assembly that may be used with the wind turbine shown in FIG. 1.

FIG. 4 is a cross-sectional schematic view of a first alternative nacelle assembly 200 that may be used with wind turbine 10 (shown in FIG. 1). Nacelle assembly 200 is substantially similar to nacelle assembly 100 (shown in FIG. 2) except nacelle assembly 200 includes cylindrical rollers 218 rather than frusto-conical rollers 118. As such, similar components are labeled with similar references.

More specifically, in the exemplary embodiment, nacelle assembly 200 includes yaw bearing 102 with substantially cylindrical rollers 218. Further, nacelle assembly 200 includes a center bearing retainer 244 that is substantially cylindrical to correspond to the shape of rollers 218. More specifically, center bearing retainer 244 is coupled to, or formed integrally as one piece with, tower 12 and/or support flange 138. An inner surface 252 of center bearing retainer 244 is positioned adjacent an outer surface 274 of rollers 218. Center bearing retainer 244 also acts as a lower support for sliding pad 162 and, as such, an upper surface 276 of center bearing retainer 244 is positioned adjacent a lower surface 278 of sliding pad 162. Alternatively, nacelle assembly 200 includes lower support 170 (shown in FIG. 2), which is separate from center bearing retainer 144. During operation of wind turbine 10, cylindrical rollers 218 do not substantially oppose lateral movement of base 110 with respect to tower 12. However, sliding pad 162 opposes lateral movement of base 110 with respect to tower 12.

Figure 5:
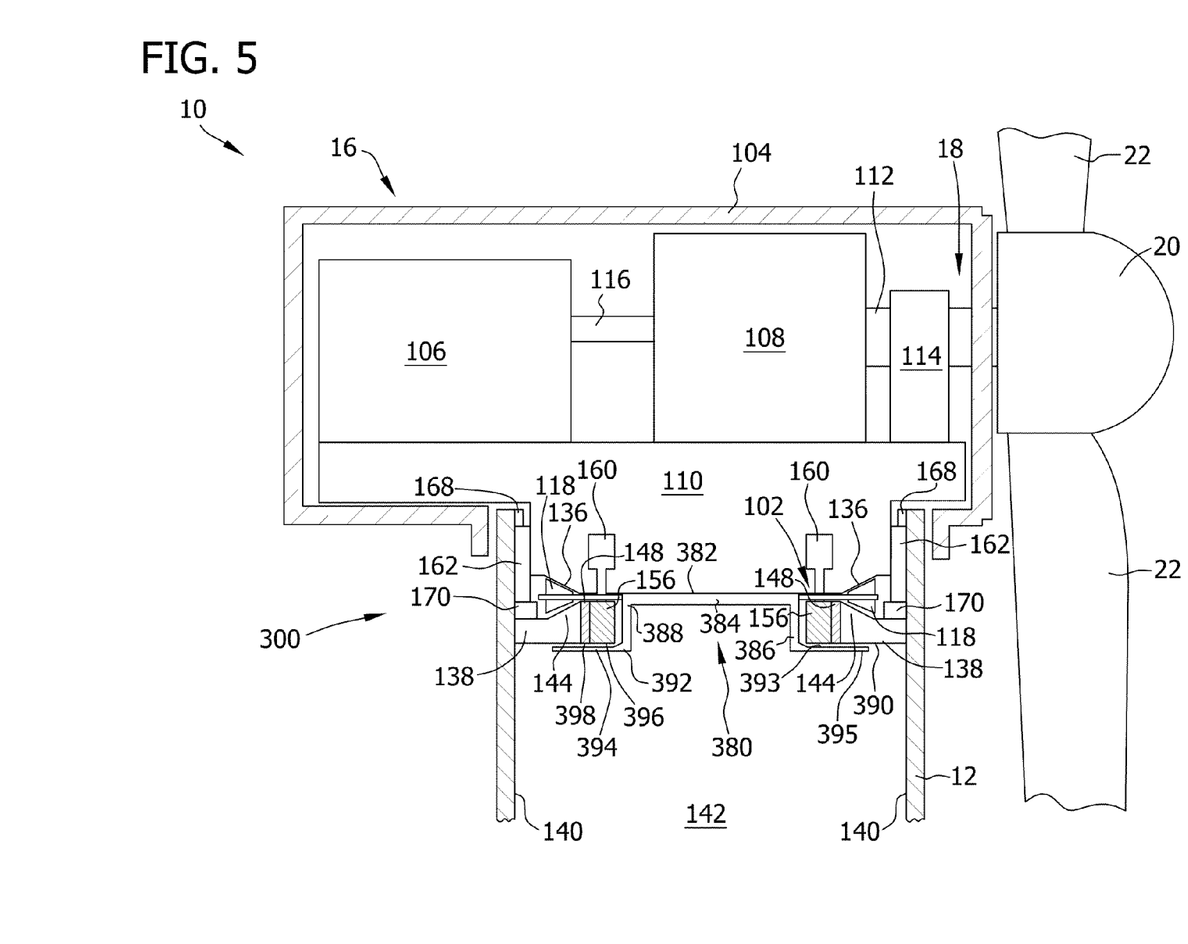
FIG. 5 is a cross-sectional schematic view of a second alternative nacelle assembly that may be used with the wind turbine shown in FIG. 1.

FIG. 5 is a cross-sectional schematic view of a second alternative nacelle assembly 300 that may be used with wind turbine 10 (shown in FIG. 1). Nacelle assembly 300 is substantially similar to nacelle assembly 100 (shown in FIG. 2) except nacelle assembly 300 includes a retaining device 380. As such, similar components are labeled with similar references.

More specifically, retaining device 380 extends downward from a lower surface 382 of base 110. Retaining device 380 is coupled to, or formed integrally as one piece with, base 110. Retaining device 380 includes a center portion 384 that is coupled to, or formed integrally as one piece with, base 110. A substantially cylindrical portion 386 extends downward from center portion 384 through center opening 124 (shown in FIG. 3) of yaw bearing 102. At an upper end 388, cylindrical portion 386 is coupled to, or formed integrally as one piece with, center portion 384. In the exemplary embodiment, cylindrical portion 386 extends from center portion 384 beyond a lower surface 390 of support flange 138 such that a lower end 392 of cylindrical portion 386 is nearer supporting surface 14 (shown in FIG. 1) than lower surface 390 of support flange 138 is to supporting surface 14.

Further, in the exemplary embodiment, a substantially circular arm 394 extends radially outward from lower end 392 of cylindrical portion 386. More specifically, arm 394 is below a lower surface 396 of inner tooth gears 156, a lower surface 398 of outer tooth gear 148, and lower surface 390 of support flange 138. Arm 394 has a substantially planar upper surface 393 and/or a substantially planar lower surface 395. Alternatively, or additionally, upper surface 393 and/or lower surface 395 may be substantially parallel to lower surface 390 of support flange 138.

During operation of wind turbine 10, retaining device 380 secures nacelle assembly 300 to tower 12. More specifically, if nacelle assembly 300 begins to move upwardly and/or laterally away from tower 12, arm 394 of retaining device 380 contacts lower surfaces 390, 396, and/or 398 to secure base 110 to tower 12. Further, arm 394 can also collect bearing and/or gear fluids.

The nacelle assemblies described herein can also be used in dual rotor wind turbine applications. More specifically, in coaxial counter-rotating wind turbines, rotational torque of each rotor is different. However, the above-described nacelle assemblies facilitate canceling the rotational torque difference on a main frame of the dual rotor wind turbine. Further, the nacelle assemblies described herein compensate for differing weights and/or bending moments when one rotor is upwind and the other rotor is downwind.

The above-described embodiments facilitate supporting bending and/or torsion moments laterally and supporting a weight of the nacelle on a flat or tapered bearing or a sliding ring. The yaw bearing described herein does not require yaw breaks and/or high precision machining and/or fabrication. Further, the embodiments described herein include at least one sliding pad that is in contact with a base of the nacelle and includes low friction material. The above-described sliding pad supports the nacelle laterally while allowing the nacelle to rotate with respect to a tower. Further, the sliding pad is segmented to allow a segment of the sliding pad to be removed, replaced, and/or adjusted without removing, replacing, and/or adjusting the entire sliding pad.

Moreover, the above-described embodiments improve cooling effectiveness, provide a more stable yaw system as compared to yaw systems including a conventional slew bearing and/or slide bearing, and reduce a cost of the wind turbine as compared to wind turbines that includes high precision machined and/or fabricated bearings.

Exemplary embodiments of a wind turbine and method of assembling the same are described above in detail. The method and assemblies are not limited to the specific embodiments described herein, but rather, components of assemblies and/or steps of the method may be utilized independently and separately from other components and/or steps described herein. For example, the method may also be used in combination with other yawing systems and methods, and are not limited to practice with only the wind turbine and methods as described herein. Rather, the exemplary embodiment can be implemented and utilized in connection with many other yawing and/or rotation applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a wind turbine, said method comprising:
    coupling a support flange to an inner surface of a tower, the support flange including an inner surface positioned radially inward from the inner surface of the tower;
    positioning a yaw bearing on the support flange, the yaw bearing including a plurality of horizontally oriented rollers positioned between the inner surface of the tower and the inner surface of the support flange;
    positioning a base of a nacelle assembly on the yaw bearing such that the base is rotatable with respect to the tower; and
    coupling a sliding pad to an inner surface of the tower adjacent the base and above the support flange.

2. A method in accordance with claim 1 wherein said sliding pad comprises a plurality of segments.

3. A method in accordance with claim 1 further comprising coupling an outer tooth gear to at least the support flange, wherein the plurality of horizontally oriented rollers are positioned between the outer tooth gear the inner surface of the tower.

4. A method in accordance with claim 3 further comprising:
    coupling at least one motor to the base, the at least one motor extending through a center opening of the yaw bearing;
    coupling an inner tooth gear to the at least one motor; and engaging the inner tooth gear with the outer tooth gear.

5. A nacelle assembly comprising:
    a base;
    a support flange extending from a tower and comprising an inner surface positioned radially inward from the tower;
    a yaw bearing coupled between said base and said support flange, said yaw bearing comprising a plurality of horizontally oriented rollers configured to support said base thereon, said plurality of horizontally oriented rollers positioned between the inner surface of said support flange and the tower; and a sliding pad coupled between said base and an inner surface of the tower above said support flange.

6. A nacelle assembly in accordance with claim 5 wherein said sliding pad comprises at least one of a solid material and a pressurized pad configured to retain a pressurizing media therein.

7. A nacelle assembly in accordance with claim 5 further comprising an outer tooth gear coupled to said inner surface of said support flange, said plurality of horizontally oriented rollers positioned between said outer tooth gear and the tower.

8. A nacelle assembly in accordance with claim 5 further comprising:
   a motor coupled to said base; and
   an inner tooth gear coupled to said motor, said inner tooth gear and said motor configured to rotate said base with respect to the tower.

9. A nacelle assembly in accordance with claim 5 further comprising a retaining device extending from said base, said retaining device configured to contact said support flange to secure said base to the tower.

10. A nacelle assembly in accordance with claim 5 further comprising a center bearing retainer coupled to said support flange, said center bearing retainer configured to secure said yaw bearing with respect to said support flange between said center bearing retainer and an inner surface of the tower.

11. A nacelle assembly in accordance with claim 5 wherein said plurality of horizontally oriented rollers comprises a plurality of frusto-conically shaped rollers.

12. A nacelle assembly in accordance with claim 5 wherein said plurality of horizontally oriented rollers comprises a plurality of cylindrically shaped rollers.

13. A nacelle assembly in accordance with claim 5 wherein said yaw bearing comprises an open needle slew bearing comprising said plurality of horizontally oriented rollers, wherein said plurality of horizontally oriented rollers are in direct contact with said base and said support flange.

14. A wind turbine comprising:
   a tower coupled to a supporting surface; and
   a nacelle assembly coupled to said tower, said nacelle assembly comprising:
   a base;
   a support flange extending from said tower and comprising an inner surface positioned radially inward from said tower;
   a yaw bearing coupled between said base and said support flange, said yaw bearing comprising a plurality of horizontally oriented rollers configured to support said base thereon, said plurality of horizontally oriented rollers positioned between the inner surface of said support flange and said tower; and
   a sliding pad coupled between said base and an inner surface of said tower and positioned above said support flange.

15. A wind turbine in accordance with claim 14 wherein said nacelle assembly further comprises:
   a generator supported on said base;
   a gearbox supported on said base;
   a high speed shaft coupled to said generator and said gearbox; and
   a low speed shaft coupled to said gearbox and a blade hub.

16. A wind turbine in accordance with claim 14, wherein said sliding pad further comprises a plurality of segments circumferentially coupled about the inner surface of said tower.

17. A wind turbine in accordance with claim 14 further comprising:
   an outer tooth gear coupled to said support flange;
   a motor coupled to said base; and
   an inner tooth gear coupled to said motor, said inner tooth gear configured to engage said outer tooth gear to rotate said base with respect to said tower.

18. A wind turbine in accordance with claim 14, wherein said plurality of horizontally oriented rollers comprises one of a plurality of frusto-conically shaped rollers and a plurality of cylindrically shaped rollers.

19. A wind turbine in accordance with claim 14 further comprising a retaining device extending from said base, said retaining device configured to contact said support flange to secure said base to said tower.

* * * * *